(12) United States Patent
Miklosi et al.

(10) Patent No.: US 6,520,561 B1
(45) Date of Patent: Feb. 18, 2003

(54) COVERING DEVICE FOR A CONVERTIBLE TOP COMPARTMENT

(75) Inventors: Stefan Miklosi, München (DE); Thomas Schütt, Fürstenfeldbruck (DE)

(73) Assignee: Webasto Vehicle Systems International GmbH, Stockdorf (DE)

(*) Notice: Subject to any disclaimer, the term of this patent is extended or adjusted under 35 U.S.C. 154(b) by 0 days.

(21) Appl. No.: 09/786,920

(22) PCT Filed: Jul. 10, 2000

(86) PCT No.: PCT/EP00/06514

§ 371 (c)(1),
(2), (4) Date: Jun. 21, 2001

(87) PCT Pub. No.: WO01/03961

PCT Pub. Date: Jan. 18, 2001

(30) Foreign Application Priority Data

Jul. 12, 1999 (DE) .......................................... 199 32 502

(51) Int. Cl.⁷ ................................................. B60J 7/20
(52) U.S. Cl. .................................. 296/136; 296/107.08
(58) Field of Search ............................. 296/107.08, 136

(56) References Cited

U.S. PATENT DOCUMENTS

| | | | | | |
|---|---|---|---|---|---|
| 2,845,299 | A | * | 7/1958 | Pickering | .................... 296/136 |
| 3,338,624 | A | * | 8/1967 | Champion | .................. 296/136 |
| 3,377,099 | A | * | 4/1968 | Podolan | ...................... 296/136 |
| 5,533,777 | A | * | 7/1996 | Kleemann et al. | .. 296/107.08 X |
| 6,145,915 | A | * | 11/2000 | Queveau et al. | ....... 296/107.08 |

FOREIGN PATENT DOCUMENTS

| | | |
|---|---|---|
| DE | 42 32 147 | 9/1993 |
| DE | 195 18 071 | 11/1996 |
| DE | 197 06 444 | 6/1998 |
| DE | 197 14 105 | 10/1998 |

* cited by examiner

*Primary Examiner*—Dennis H. Pedder
(74) *Attorney, Agent, or Firm*—Nixon Peabody LLP; David S. Safran

(57) ABSTRACT

A covering device for a convertible-top compartment of a motor vehicle and includes a cover section that, in a forward position, covers a front area of the convertible-top compartment. The cover section is moved longitudinally from the forward position to a rearward position via a positive control mechanism.

9 Claims, 3 Drawing Sheets

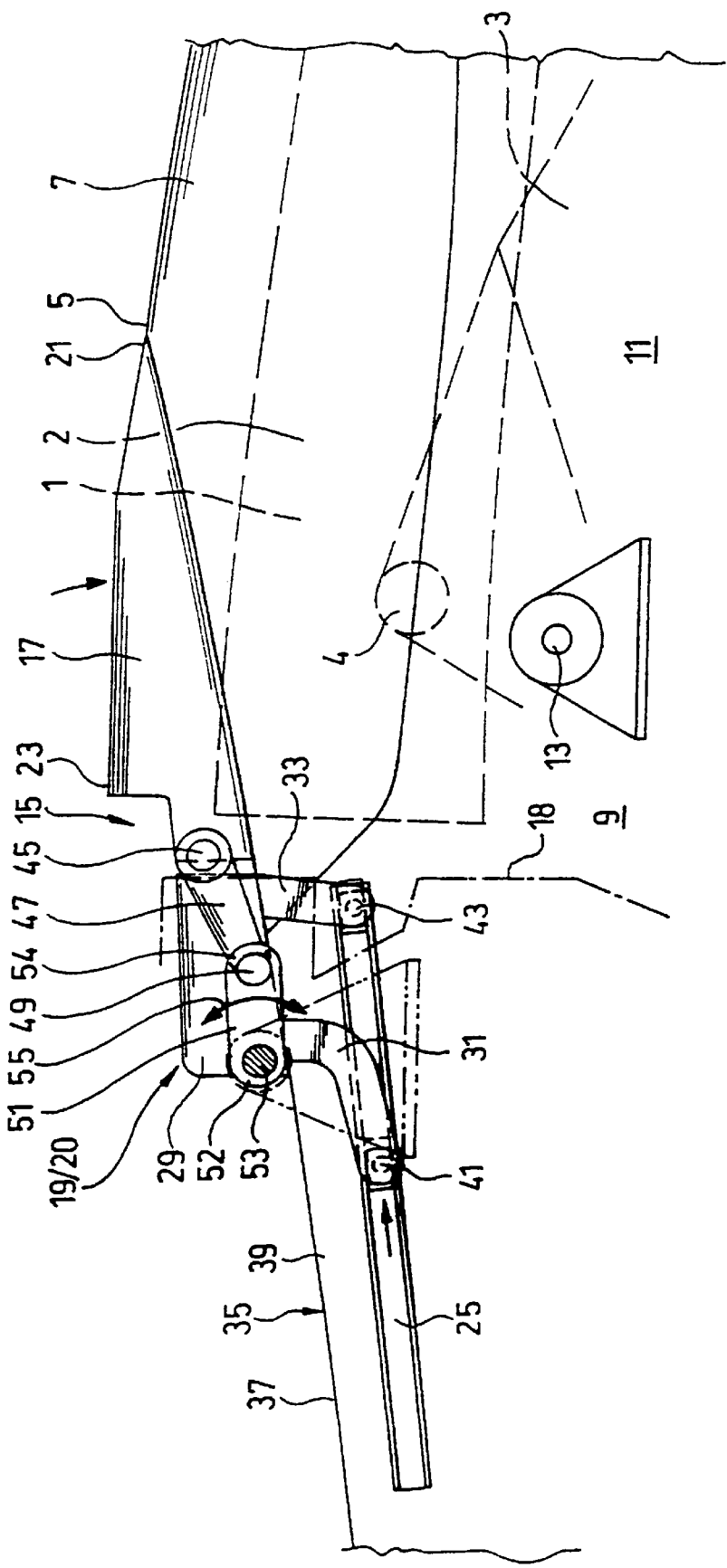

COVERING DEVICE FOR A CONVERTIBLE TOP COMPARTMENT

BACKGROUND OF THE INVENTION

1. Field of the Invention

The present invention is directed to a covering device for a front area of a convertible-top compartment located in the rear of a motor vehicle, and includes a covering section that may also be used as a hat rest behind either a back seat of the motor vehicle or behind the driver and passenger seats of a two-seat sports car.

2. Description of the Prior Art

In motor vehicles having a foldable fabric convertible top it is known that behind the back seats there is a convertible-top compartment which is covered with a covering flap. If the convertible top is to be folded into the convertible-top compartment, the covering flap is pivoted upward over an articulated mechanism which is located in the rear end area in order to enable access to the convertible-top compartment. After the convertible top is folded in, the convertible-top compartment is closed by the covering flap being pivoted down again. Since the covering flap is located directly behind the back seats, it is also used as a hat rack at the same time.

In convertibles of the type of a Mercedes-Benz SLK, with a rigid roof section and rear window section which can be folded together via a positive control mechanism and can be housed in a stowage space under the rear hatch, the hat rest behind the back seats which is also used as the front covering for the convertible-top compartment is made very complex. In conventional approaches, the front covering for the convertible top stowage space is generally divided into two side covers which pivot away laterally to the top, and a middle section which can be lowered to the bottom when the convertible top is folded together and housed in the stowage space. It is also difficult both with the convertible top opened and also with the convertible top closed to obtain an attractive, fitting joint picture on the one hand between the front covering and the rear window section and on the other hand between the front covering and the rear hatch. A multipart covering is known from German Patent Publication DE 197 14 105 A1.

SUMMARY OF THE INVENTION

An object of the present invention is to provide a covering device for the front area of a convertible-top compartment which is located in the rear of the motor vehicle, the covering device having a simple structure yet yielding an optically attractive joint picture with the convertible top in both a closed position or an open position.

This and other objects are achieved by a covering device for a convertible-top compartment located in the rear area of the motor vehicle in that a covering section for the covering device, in addition to providing pivoting support, can be moved forward and backward in horizontally via a positive control mechanism. By moving the covering section from the front position into the rear position, it is possible to form between the two end positions of the back edge of the covering section a peripheral gap. The peripheral gap is filled by an end section of the rear window section when the covering section is in the front position, then the rear bottom area of the rear window section ending flush with the front edge of the rear hatch.

When the roof structure is housed in the stowage space, the covering section is located in the rear position, the rear end edge of the covering section ending flush with the front end edge of the rear hatch. Thus, in each position of the covering section an optically attractive joint picture is ensured, only a one-piece covering section being necessary and the positive control mechanism which is connected to it having a relatively simple structure. The horizontal movement capacity of the covering section ensures that for synchronized motion of the roof structure which is being folded together and for motion of the rear hatch around a pivoting axis which is located in the rear area of the rear hatch a collision of the moving parts is avoided. In one advantageous version of the covering device, the covering section while it is being moved can also be pivoted to the top so that with the synchronized opening and closing motion of the roof structure a collision of the moving parts is reliably prevented.

Preferred embodiments of the invention are detailed below with reference to the attached drawings.

BRIEF DESCRIPTION OF THE DRAWINGS

FIG. 3 shows a side view of the rear area of a convertible with a covering section for the front area of the convertible-top compartment in which the covering section is located in the back position.

DETAILED DESCRIPTION OF THE PREFERRED EMBODIMENTS

Figure 1:
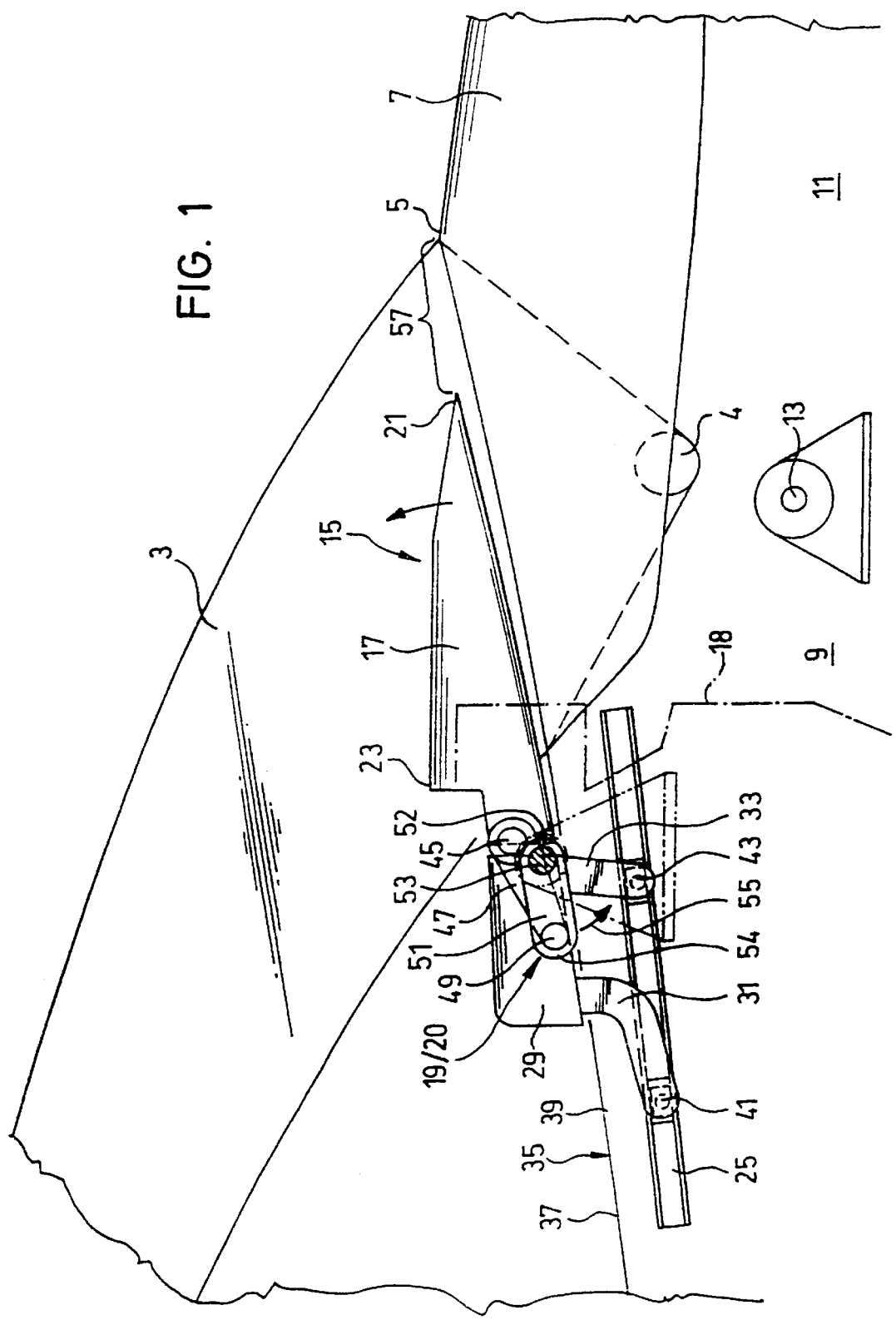
FIG. 1 shows a side view of the rear area of a convertible with a covering section for the front area of the convertible-top compartment in which the covering section is located in the front position.
Figure 2:
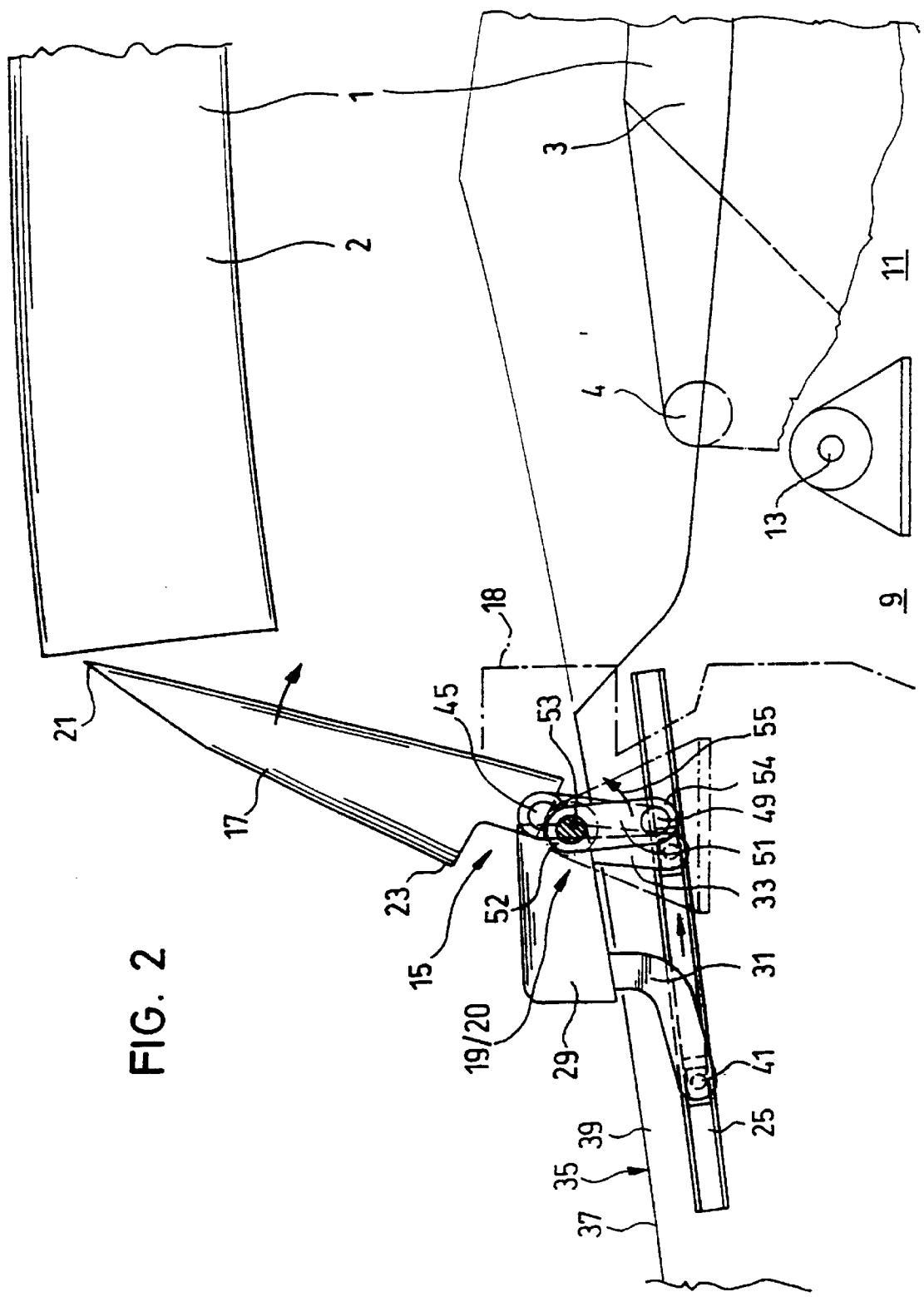
FIG. 2 shows a side view of the rear area of a convertible with a covering section for the front area of the convertible-top compartment in which the covering section is located in the transition position between the front position and the rear position.

According to FIGS. 1–3, one extract of the rear area of a convertible in a side view is shown at a time, in the drawings on the left is the front end and in the drawings on the right is the back end of the motor vehicle. As shown in FIGS. 2 and 3, the motor vehicle has a convertible top roof structure 1 made as a convertible top including a rigid roof section 2 which is attached to the top edge of the windshield (not shown) and a rear window section 3 which is coupled to the rigid roof section 2. The convertible top roof structure 1 is coupled adjacent to a front edge 5 of a rear hatch 7 to the body 9 of the motor vehicle via a hinge 4. The rear hatch 7 can be pivoted about a rear pivoting axis (not shown) in order to enable the convertible top roof structure 1 to be folded in and stowed in a stowage space 11 which is used as the convertible-top compartment underneath the rear hatch 7. The rear hatch 7 can be pivoted about the front pivoting axis 13 in order to make the stowage space 11 which can be used as the trunk accessible for loading.

In FIG. 1, a covering device 15 is shown including a covering section 17 and a positive control mechanism 19. The covering section 17 is a plate-like, flat component which is made sickle-shaped or half moon-shaped when viewed from overhead and covers the area behind the back seats 18 (schematically shown). The covering section 17 is used as both a hat rack and a front covering of the stowage space 17 which is used as the convertible-top compartment 11. Via the positive control mechanism 19, the covering section 17 can be moved essentially horizontally and can assume a front position as shown in FIG. 1, in which the convertible top roof structure 1 is closed, or assume a rear position as shown in FIG. 3, in which the convertible top roof structure 1 is opened.

The covering device 15 is detailed below in the front position as shown in FIG. 1. The covering section 17 has a rear edge 21 which is made arc-shaped when viewed from the top and in the front position correlates to the inner contour of the lower rear section of the rear window section 3 and adjoins it. The front edge 23 of the covering section 17 ends with the top contour of the backrest of the back seat 18. Furthermore, the outside contour of the rear window section 3 runs flush to the front edge 5 of the rear hatch 7. Laterally to the left and right in the area of the backrest of the rear seat 18 is a guide unit 20 for the positive control mechanism 19. The guide unit 20 includes a linear bearing unit 25 which is positioned descending essentially horizontally with respect to the longitudinal direction of the motor vehicle, roughly in the frontal direction of the motor vehicle. In the linear bearing unit 25, a carriage 29 is guided, the carriage 29 being connected to the linear bearing unit 25 via a front projection 31 which projects downward by sliding sections and by a rear projection 33 which projects downward.

The linear bearing unit 25 is covered by rigid side trim 35 which is located in the side area of the rear seat 18, the top surface 37 of the rigid side trim 35 running parallel to the linear bearing unit 25. The projections 31, 33 of the carriage 29 extend through a slot 39 which is made in the side trim 35 over the top surface 37 of the rigid side trim 35 as far as the connecting points 41, 43 with the linear bearing unit 25. The front projection 31 extends underneath the rigid side trim 35 forward in order to achieve a distance as large as possible between the connecting sites 41 and 43 of the two projections 31 and 33 and the linear bearing unit 25 and thus to ensure good guidance for the carriage 29. The carriage 29 is also used as a side covering which covers the side trim 35 at least partially from overhead.

On the rear end area and roughly in the area of the front edge 23 of the covering section 17 is an axis of rotation 45 by which the covering section 17 is pivotably connected with its front side sections to the carriage 29 so that the covering section 17 can be pivoted upward and downward via the axis of rotation 45. As shown in FIG. 1, the covering section 17 has a lever 47 which extends forward with a front end which is provided with a hinge 49. Connected to the motor vehicle body 9 is a rotating drive lever 51 which is pivotably supported with an end 52 via the axis of rotation 53 relative to the body 9. The axis of rotation 53 is fixed relative to the body 9 and located roughly in the area of the front edge 23 of the covering section 17. The other end 54 of the drive lever 51 is pivotably connected to the hinge 49 of the lever 47. The length of the drive lever 51 is somewhat shorter than the length of the lever 47 of the covering section 17, which lever extends forward.

In the following, the sequence of motions of the covering device 15 is detailed, proceeding from the front position as was described above with reference to FIG. 1, through an intermediate position as shown in FIG. 2, and into the rear position as shown in FIG. 3. If the covering section 17 is in the front position, the convertible top roof structure 1 is in the closed position, the rear edge 21 of the covering section 17 adjoins the lower inner section of the rear window section 3. The covering section 17 moves from the position as shown in FIG. 1 into the rear position as shown in FIG. 3 in synchronization with the opening motion of the convertible top roof structure 1 and the stowage of the folded-together convertible top roof structure 1 in the stowage space (convertible-top compartment) 11 underneath the roof hatch 7, and moves with respect to the closing motion of the roof structure (convertible top) 1 in the reverse sequence.

Proceeding from the position as shown in FIG. 1, the drive lever 51 turns counterclockwise 55 from its position aligned substantially horizontal, the covering section 17 pivoting about its axis of rotation 45 so that the covering section 17 with its rear edge 21 moves upward. Simultaneously, or, if necessary, before the start of the rotary motion of the drive lever 51 counterclockwise, the rear window section 3 is pivoted to the rear about its axis of rotation 4 which is located in the rear lower section of the rear window section 3, and synchronously to this motion of the rear window section 3, the rear hatch 7 is also pivoted upward about its rear pivoting axis (not shown) in order to enable access to the stowage space (convertible-top compartment) 11 for the roof structure 1 which is being folded together.

The initial pivoting motion of the covering section 17 upward is determined by the vertical portion of the circular motion of the hinge 49, or by the portion of motion perpendicular to the alignment of the linear bearing unit 25. Moreover, the circular motion of the hinge 49 has a horizontal component of motion or a component of motion parallel to the linear bearing unit 25 which forces the carriage 29 to move backward. The component of motion of the carriage 29 along the linear bearing unit 25 is very small in this initial position of the drive lever 51. If the hinge 49 as shown in FIG. 2 is at its lowest point, or the drive lever 51 has been turned relative to its initial position or relative to the lengthwise extension of the linear bearing unit 25 by roughly 90°, the covering section 17 with its rear edge 21 is at the highest point which is the reversal point of the pivoting motion of the covering section 17. In this position of the drive lever 51, the speed of motion or the component of motion of the carriage 29 is maximum along the linear bearing unit 25.

If the drive lever 51 proceeding from the position shown in FIG. 2 continues to turn counterclockwise 55 by roughly another 90°, until the drive lever 51 is aligned roughly parallel again to the linear bearing unit 25, as is shown in FIG. 3, the covering section 17 is again pivoted downward in the direction to the front edge 5 of the rear hatch 7, the covering section 17 via the carriage 29 experiencing further motion along the linear bearing unit to the rear. In the rear position of the covering section 17 shown in FIG. 3, the rear edge 21 of the covering section 17 ends flush with the front edge 5 of the rear hatch 7. Between the front position (FIG. 1) and the rear position (FIG. 3) of the covering section 17, between these two end positions of the rear edge 21 of the covering section 17, a gap 57 is formed which when viewed from above has a roughly sickle shape, the gap 57 with the convertible top roof structure 1 closed being filled by the lower section of the rear window section 3. The entire path of the carriage 29 which has been traversed over the roughly 180° rotary motion of the drive lever 51 along the linear bearing unit 25 corresponds roughly to twice the length of the drive lever 51.

Reference Number List

| | |
|---|---|
| 1 | roof structure (convertible top) |
| 2 | roof element |
| 3 | rear window element |
| 4 | rotary axis of the rear window element |
| 5 | front edge of the rear hatch |
| 7 | rear hatch |
| 9 | body |
| 11 | stowage space (convertible-top compartment) |

-continued

| | |
|---|---|
| 13 | front swivelling axis of the rear hatch |
| 15 | covering device |
| 17 | covering element |
| 18 | back seat |
| 19 | positive control mechanism |
| 20 | mechanism unit |
| 21 | rear edge of the covering element |
| 23 | front edge of the covering element |
| 25 | linear bearing unit |
| 29 | carriage |
| 31 | front projection |
| 33 | rear projection |
| 35 | solid side trim |
| 37 | top surface of the side trim |
| 39 | slot |
| 41 | connecting point |
| 43 | connecting point |
| 45 | rotary axis of the covering element |
| 47 | lever |
| 49 | hinge |
| 51 | drive lever |
| 52 | end of the drive lever |
| 53 | rotary axis of the drive lever |
| 54 | other end of the drive lever |
| 55 | arrow |
| 57 | gap |

What is claimed is:

1. Covering device for a convertible-top compartment for stowing a convertible top of a motor vehicle, said covering device comprising:

a cover section having a forward position and a rearward position for covering the convertible-top compartment; and a control mechanism pivotably connected to said cover section and providing pivotable motion to said cover section around an axis of rotation during motion of the convertible top between closed and stowed positions thereof, wherein said control mechanism selectively provides longitudinal motion to said axis of rotation of said cover section in moving said cover section between said forward position and said rearward position and provides said pivotable motion both swinging the cover section from a lowered position to a raised position and from said raised position back to the lowered position during said longitudinal motion from said forward position to said rearward position.

2. The covering device as claimed in claim 1, wherein said cover section is movable into said forward position when the convertible top is in a closed position and is movable into said rearward position when the convertible top is in a open position and stowed in the convertible-top compartment.

3. Covering device for a convertible-top compartment for stowing a convertible top of a motor vehicle, said covering device comprising:

a cover section having a forward position and a rearward position for covering the convertible-top compartment; and a control mechanism pivotably connected to said cover section and providing pivotable motion to said cover section around an axis of rotation during motion of the convertible top between closed and stowed positions thereof, wherein said control mechanism selectively provides longitudinal motion to said axis of rotation of said cover section in moving said cover section between said forward position and said rearward position, and wherein a rear edge of said covering section is positioned proximate to a rear window section of the motor vehicle when said covering section is placed into said forward position and said rear edge is positioned proximate to a rear hatch of the motor vehicle when said covering section is placed in said rearward position.

4. The covering device as claimed in claim 3, wherein said cover section pivots about an axis of rotation located proximate to a front edge of said covering section.

5. The covering device as claimed in claim 4, wherein said control mechanism comprises a guide unit for translating motion to said covering section relative to the motor vehicle, a linear bearing unit, a carriage movably supported in said linear bearing unit and having a pivotal axis located about which said cover section pivots, a drive lever, and a hinge for pivotably connecting said drive lever to said cover section.

6. The covering device as claimed in claim 5, wherein the longitudinal motion and the pivotal motion of said cover section is executed by the motion of said drive lever.

7. The covering device as claimed in claim 6, wherein the axis of rotation of said cover section is located proximate to and above the axis of rotation of said drive lever when said cover section is in a forward position.

8. The covering device as claimed in claim 7, wherein the cover section is selectively moved from the forward position when said drive lever is rotated counterclockwise approximately 90° about the axis of rotation of said drive lever, with said carriage being longitudinally moved simultaneously along said linear bearing, said cover section being pivoted downward when said drive lever is again rotated counterclockwise approximately 90° about the axis of rotation of said drive lever to place said cover section into the rearward position.

9. The covering device as claimed in claim 8, wherein said carriage includes a side covering for covering a side trim of the motor vehicle.

\* \* \* \* \*